United States Patent [19]

Ito

[11] Patent Number: 4,509,915
[45] Date of Patent: Apr. 9, 1985

[54] LIQUID FUEL COMBUSTION APPARATUS

[75] Inventor: Hirosato Ito, Osaka, Japan

[73] Assignee: Osaka Gas Company Limited, Osaka, Japan

[21] Appl. No.: 416,249

[22] Filed: Sep. 9, 1982

[30] Foreign Application Priority Data

Sep. 21, 1981 [JP] Japan .................................. 56-150331
Sep. 21, 1981 [JP] Japan .................................. 56-150332

[51] Int. Cl.³ .............................................. F23D 11/00
[52] U.S. Cl. ..................................... 431/215; 431/10; 431/351; 55/158
[58] Field of Search ................ 431/10, 215, 351, 352; 55/16, 158

[56] References Cited

U.S. PATENT DOCUMENTS

| | | | |
|---|---|---|---|
| 1,101,789 | 6/1914 | Doherty | 431/10 |
| 2,458,542 | 1/1949 | Urquhart | 431/10 |
| 2,563,683 | 8/1951 | Lewis | 431/215 |
| 3,283,801 | 11/1966 | Blodgett et al. | 431/10 |
| 3,733,165 | 5/1973 | Nakagawa et al. | 431/10 |
| 3,779,212 | 12/1973 | Wagner | 431/10 |
| 3,942,324 | 3/1976 | Johansson et al. | 431/215 |
| 3,976,451 | 8/1976 | Blackmer et al. | 55/158 |
| 4,004,875 | 1/1977 | Zinke et al. | 431/187 |
| 4,141,505 | 2/1979 | Reich | 431/351 |
| 4,245,980 | 1/1981 | Reed et al. | 431/182 |
| 4,281,983 | 8/1981 | Goodnight et al. | 431/188 |
| 4,431,403 | 2/1984 | Nowak et al. | 431/352 |

FOREIGN PATENT DOCUMENTS

| | | | |
|---|---|---|---|
| 0024718 | 3/1981 | European Pat. Off. | 55/158 |
| 938603 | 9/1979 | Fed. Rep. of Germany | 55/158 |
| 52-233 | 4/1977 | Japan | 431/10 |
| 19004 | 2/1982 | Japan | 55/158 |
| 194004 | 11/1982 | Japan | 55/158 |
| 585369 | 12/1977 | U.S.S.R. | 431/351 |

Primary Examiner—Samuel Scott
Assistant Examiner—Helen Ann Odar
Attorney, Agent, or Firm—Wenderoth, Lind & Ponack

[57] ABSTRACT

A combustion apparatus for burning liquid fuels has a burner for atomizing and burning the liquid fuels. Oxygen enriched air, obtained by passing normal air through an oxygen permselective membrane, is supplied to the burner as air for combustion.

2 Claims, 4 Drawing Figures

LIQUID FUEL COMBUSTION APPARATUS

BACKGROUND OF THE INVENTION

1. Field of the Invention

The present invention relates to an apparatus for combustion of liquid fuels.

2. Description of the Prior Art

It has heretofore been difficult to effectuate a satisfactory combustion of liquid fuels having a high degree of viscosity and, in addition, containing a large amount of organic nitrogen compounds, for example, heavy oil.

The object of the present invention is to provide an apparatus for burning liquid fuels such as heavy oil with satisfactory results, bringing about a solution to such technical problem as mentioned above.

SUMMARY OF THE INVENTION

To accomplish the foregoing object, there is provided a liquid fuel combustion apparatus, having a burner for atomizing and burning the liquid fuels, which comprises supply means for supplying oxygen-enriched air obtained by passing normal air through an oxygen permselective membrane to the burner as air for combustion.

According to the present invention, liquid fuel is atomized by gaseous fuel and oxygen-enriched air is utilized, whereby it is possible to achieve a satisfactory combustion of liquid fuels such as heavy oil, with the generation of NOx restrained.

According to a preferred embodiment of the invention, liquid fuels are atomized with gaseous fuels or nitrogen-enriched air. In addition, oxygen-enriched air or air for supplying an oxygen permselective membrane is preheated with exhaust gas by heat exchange. Furthermore, the oxygen-enriched air is obtained from the normal air, and supplied to the burner as primary air.

According to one example, liquid fuel is atomized by means of nitrogen-enriched air, while oxygen-enriched air is supplied as the secondary air, and therefore it is possible to achieve a satisfactory combustion, with a reduction in the amount of NOx generated.

DETAILED DESCRIPTION OF THE PREFERRED EMBODIMENTS

Figure 1:
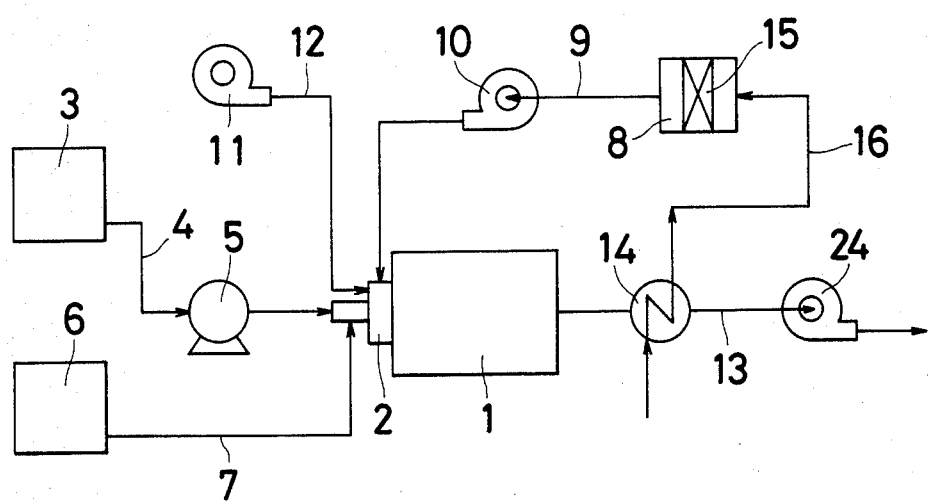
FIG. 1 is a diagram of an embodiment of the present invention.

FIG. 1 is the diagram of an example of an embodiment of the present invention. A combustion furnace 1 is provided with a burner 2. This burner 2 is supplied with a liquid fuel, for example, heavy oil, stored in a tank 3, by means of a pump 5 provided midway in a pipe conduit 4. It is also supplied with a gaseous fuel, for example town gas or liquefied natural gas, from a tank 6, through a pipe conduit 7. Further, oxygen-enriched air obtained by an oxygen-enriched air generating means 8 is supplied, as the primary air, to the burner 2 by means of an induction fan 10 provided midway in a pipe conduit 9. Still further, air drawn in from the atmosphere by a blower 11 is supplied through a pipe conduit 12 to the burner 2, as the secondary air.

In the burner 2, liquid fuel is atomized by the gaseous fuel and is burned with the primary and secondary air. By virtue of such arrangement, an efficient combustion, with a reduction in the amount of NOx generated, is realized. Waste gas from the combustion in the burner 2 is exhausted from an outlet of the combustion furnace 1 through an exhaust gas duct 13, induced into it by an induction fan 24 provided at its end. Midway in the exhaust gas duct 13, there is provided a heat exchanger 14 for the purpose of heat exchange between the combustion waste gas and air.

The oxygen-enriched air generating means 8 is provided with an oxygen permselective membrane 15 which is made of an ultrathin film of a high molecular silicon compound. Oxygen permselective membrane 15 performs the function of increasing the concentration of oxygen in the air flowing through it to about 23 to 31%. Furthermore, oxygen permselective membrane 15 has the property that the higher the temperature of air flowing through it, the larger is the amount of oxygen-enriched air obtained. For instance, when the air temperature is raised from 20° C. to 80° C., it is possible to obtain about twice as much oxygen-enriched air with the same concentration of oxygen. Into such oxygen-enriched air generating means 8 as described above, air preheated by the heat exchanger 14 is introduced through a pipe conduit 16. Accordingly, it is possible to obtain a relatively large amount of oxygen-enriched air, and this oxygen-enriched air is introduced into the burner 2 through the pipe conduit 9, by means of the induction fan 10.

Figure 2:
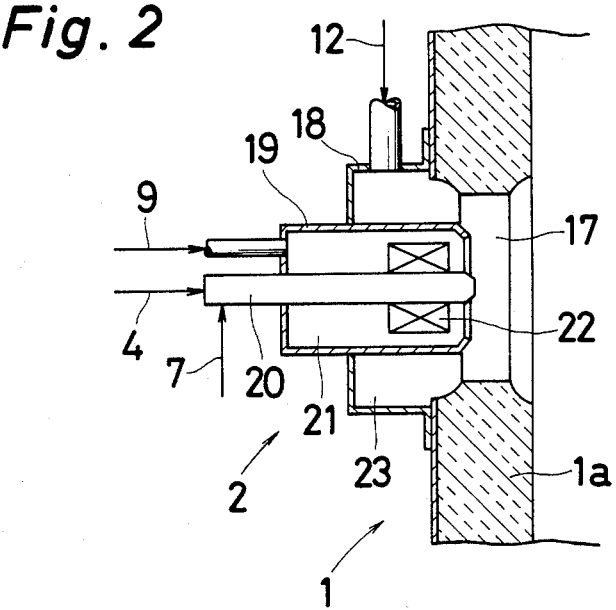
FIG. 2 is an enlarged cross-sectional view of the burner in FIG. 1, showing its structure.

FIG. 2 is an enlarged cross-sectional view of the burner 2, showing its structure. At a part of the main body of furnace 1a of the combustion furnace 1, there is formed an opening 17 at which is installed the burner 2, facing the inside of the combustion furnace 1. The burner 2 comprises an external casing 18 in cylindrical form, with a bottom covering the opening 17, an internal casing 19 in cylindrical form concentrically positioned within the external casing 18 and having a bottom with an opening toward the opening 17 of the main body of furnace 1a, and a fuel spraying cylinder 20 concentrically positioned within the internal casing 19. Between the exterior surface of the fuel spraying cylinder 20 and the interior surface of the internal casing 19, there is formed the primary air channel 21 in annular form. Midway in primary air channel 21, there is provided a fixed vane 22 on the exterior surface of the fuel spraying cylinder 20. Further, between the exterior surface of the internal casing 19 and the interior surface of the external casing 18, there is formed the secondary air channel 23 in annular form. The fuel spraying cylinder 20 is a two-fluid sprayer; and it can be either of the so-called "inside mixing type" or of the "outside mixing type".

To the fuel spraying cylinder 20 are connected the pipe conduit 4 for supply of liquid fuel and the pipe conduit 7 for supply of gaseous fuel. Further, to the internal casing 19 is connected the pipe conduit 9 for supply of oxygen-enriched air to the primary air channel 21, and to the external casing 18 is connected the pipe conduit 12 for supply of air which is not oxygen-enriched to the secondary air channel 23.

Into the burner 2 as described above, liquid fuel is jetted by the fuel spraying cylinder 20, as it is atomized by gaseous fuel. The mixture of atomized liquid fuel and gaseous fuel burns firstly with the primary air which is enriched with oxygen. For this reason, the combustion goes on in an atmosphere having a relatively high concentration of oxygen in its initial stage, hence the efficiency of combustion is improved. Accordingly, high-temperature flames are formed and, in proportion, the luminous flame radiation increases, thus bringing about an improvement in the thermal efficiency of the combustion furnace 1.

There is, on the other hand, a possibility of the formation of high-temperature flames giving rise to an increase of the amount of NOx generated. However, as the result of experiments carried out by the inventor, it was found that, where the liquid fuel used is heavy oil, when the amount of gaseous fuel supplied is 10 to 40%, in terms of calories, of the total amount of combustibles, a reduction in the amount of NOx generated can be realized. When, moreover, the amount of gaseous fuel supplied is set as above, there is brought about an improvement in the brightness of flames and the thermal efficiency is further enhanced.

As for the combustion furnace 1, with an improvement in the burning condition of fuel by virtue of the burner 2, the combustion chamber load is increased. Therefore, the size, as a whole, of the furnace can be reduced. Where, moreover, the combustion furnace 1 is equipped with an apparatus for desulfurization and/or denitration, the reduction in the amount of combustion gas exhausted, by virtue of the use of oxygen-enriched air in the burner 2, serves to alleviate the load on such equipment.

It is to be noted that, as another example of the embodiment of this invention, the heat exchanger 14 can be omitted, and that oxygen-enriched air may be used both for the primary air and the secondary air. It is to be further noted that the structure of the burner 2 is not limited to that which is shown in FIG. 2.

As, according to this example of the embodiment of the invention, liquid fuel is atomized by gaseous fuel and, besides, oxygen-enriched air is utilized, it is possible to achieve a satisfactory combustion, with the generation of NOx restrained.

Figure 3:
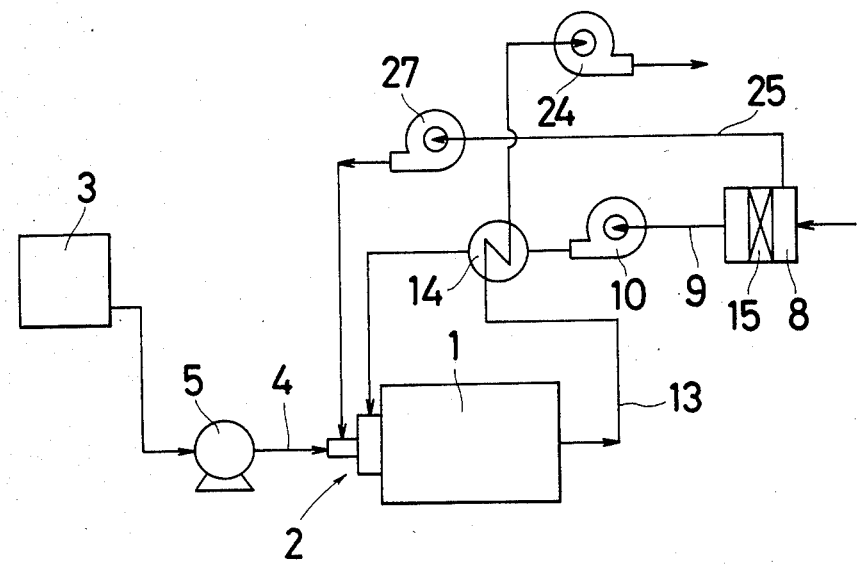
FIG. 3 is a diagram of another embodiment of this invention.

FIG. 3 is the diagram of another example of an embodiment of this invention.

In this example, while air enriched with oxygen by the oxygen-enriched air generating means 8 is supplied, by means of the induction fan 10 provided midway in the pipe conduit 9, to the burner 2, air with a relatively low concentration of oxygen, in other words, nitrogen-enriched air, from the oxygen-enriched air generating means 8, is supplied to the burner 2 through a pipe conduit 25, by means of an induction fan 27.

In the burner 2, liquid fuel is atomized by the nitrogen-enriched air, as the primary air, and oxygen-enriched air is supplied to it as the secondary air. Accordingly, an efficient combustion, with a reduction in the amount of NOx generated, is realized. Waste gas from the combustion in the burner 2 is exhausted from an outlet of the combustion furnace 1 through the exhaust gas duct 13 by an induction fan 24 into the atmosphere. In addition, midway in the exhaust gas duct 13, there is provided the heat exchanger 14 for the purpose of heat exchange between the oxygen-enriched air downstream of the induction fan 10 in the pipe conduit 9 and the combustion waste gas. Accordingly, oxygen-enriched air is supplied to the burner 2 after having been preheated.

In the oxygen-enriched air generating means 8, the concentration of oxygen in the air remaining upstream of the oxygen permselective membrane 15 becomes relatively low in proportion to the efficiency of the oxygen enriching function of the oxygen permselective membrane 15. For the purpose of supplying this nitrogen-enriched air to the burner 2, the pipe conduit 25 is connected to the oxygen-enriched air generating means 8 at the upstream side of the oxygen permselective membrane 15.

Figure 4:
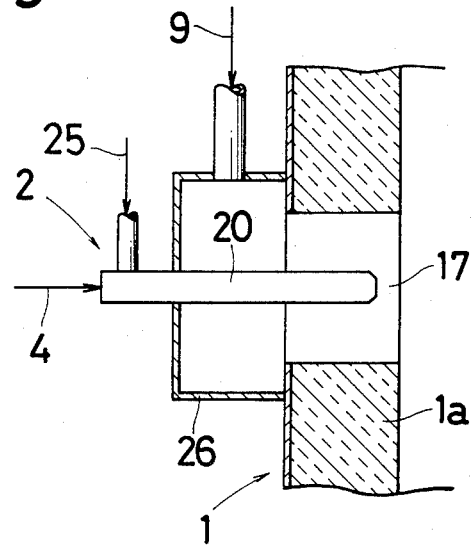
FIG. 4 is an enlarged cross-sectional view of the burner in FIG. 3, showing its structure.

FIG. 4 is an enlarged cross-sectional view of the burner 2 in FIG. 3, showing its structure. The burner 2 consists of a wind box 26 covering opening 17 in the main body of furnace 1a, and the fuel spraying cylinder 20 extends into it. This fuel spraying cylinder 20 is a two-fluid sprayer hitherto well known and can be either of the so-called "inside mixing type" or of the "outside mixing type". To the fuel spraying cylinder 20 are connected the fuel supply pipe 4 and the pipe conduit 25. Further, to the wind box 26 is connected the pipe conduit 9.

In the burner 2, liquid fuel is jetted from the fuel spraying cylinder 20 as it is atomized by nitrogen-enriched air. It is a common knowledge that, when steam or gaseous fuel is utilized as an atomizing medium of liquid fuel, the amount of NOx generated is reduced. It is obvious that, even if liquid fuel is atomized by utilization of nitrogen-enriched air as the primary air, as in this case, there is also a reduction in the amount of NOx generated. Moreover, since oxygen-enriched air is supplied as the secondary air, there occurs no degradation of the combustion efficiency of the burner 2, but a satisfactory combustion can be maintained. Furthermore, as the oxygen-enriched air is preheated, the combustion efficiency is further enhanced.

According to this example, it has been so devised that liquid fuel is atomized by means of nitrogen-enriched air, while oxygen-enriched air is supplied as the secondary air. Therefore, it is possible to achieve a satisfactory combustion, with a reduction in the amount of NOx generated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A combustion apparatus comprising:
   a combustion chamber;
   a burner adapted to be installed in an opening in said combustion chamber, said burner comprising:
      an external casing having a peripheral wall;
      an internal casing having a peripheral wall and an outer end wall closing said internal casing peripheral wall, said internal casing being positioned within said external casing and defining therewith a secondary air channel; and
      a fuel spraying cylinder extending through said outer end wall and positioned within said internal casing and defining therewith a primary air channel;
   a source of liquid fuel;
   a source of gaseous fuel;

means for supplying liquid fuel from said liquid fuel source into said fuel spraying cylinder;

means for supplying gaseous fuel from said gaseous fuel source into said fuel spraying cylinder and thereby atomizing said liquid fuel, thus forming a mixture of atomized liquid fuel and gaseous fuel;

means for generating oxygen-enriched air, said generating means comprising an oxygen permselective membrane, and duct means for supplying air to an upstream side of said membrane, whereby oxygen-enriched air passes through said membrane to a downstream side thereof;

means for supplying said oxygen-enriched air as primary air from said downstream side of said membrane through said outer end wall of said internal casing and into said primary air channel, and a fixed vane on the exterior of said fuel spraying cylinder, whereby said primary air travels along said fuel spraying cylinder and is agitated by said fixed vane, and whereby said mixture burns first in said combustion chamber with the thus agitated said primary air;

means for supplying atmospheric air as secondary air through said peripheral wall of said external casing and into said secondary air channel, whereby said secondary air spreads out into the entire interior of said external casing and is supplied to said opening, and whereby remaining of said mixture then burns in said combustion chamber with said secondary air;

exhaust means for withdrawing exhaust gases from said combustion chamber; and means for passing said air in said duct means in heat exchange relation with said exhaust gases, thereby increasing the temperature of said air supplied to said upstream side of said membrane, and thereby increasing the amount of oxygen of said oxygen-enriched air at said downstream side of said membrane.

2. An apparatus as claimed in claim 1, wherein said external and internal casings are cylindrical, and said secondary and primary air channels are annular.

* * * * *